United States Patent [19]

Fügel et al.

[11] Patent Number: 5,794,298
[45] Date of Patent: Aug. 18, 1998

[54] DEVICE FOR HANDLING A BRUSH HEAD FOR CLEANING THE SURFACE OF LARGE OBJECTS

[75] Inventors: Dietmar Fügel, Wolfschlugen; Stefan Fritz; Martin Wanner, both of Stuttgart, all of Germany

[73] Assignee: Putzmeister Aktiengesellschaft, Aichtal, Germany

[21] Appl. No.: 617,850

[22] PCT Filed: Jul. 30, 1994

[86] PCT No.: PCT/EP94/02556

§ 371 Date: Feb. 28, 1996

§ 102(e) Date: Feb. 28, 1996

[87] PCT Pub. No.: WO95/06586

PCT Pub. Date: Mar. 9, 1995

[30] Foreign Application Priority Data

Aug. 31, 1993 [DE] Germany ............ 43 29 253.4

[51] Int. Cl.$^6$ .............. B60S 3/00; A47L 11/00; B08B 7/00
[52] U.S. Cl. ............ 15/53.2; 15/50.3; 15/53.1; 15/52.1; 15/49.1; 15/DIG. 2; 134/6
[58] Field of Search .............. 15/49.1, 52.1, 15/53.1, 53.2, 50.3, DIG. 2; 134/6

[56] References Cited

U.S. PATENT DOCUMENTS 3,104,406  9/1963  Rhodes ............... 15/21
3,665,542  5/1972  Franzreb ............ 15/98

FOREIGN PATENT DOCUMENTS 0 404 684  12/1990  European Pat. Off. ........ B64F 5/00
1 327 901  8/1973  United Kingdom.

*Primary Examiner*—Lynette F. Smith
*Assistant Examiner*—Brett Nelson
*Attorney, Agent, or Firm*—Flynn, Thiel, Boutell & Tanis, P.C.

[57] ABSTRACT

The invention relates to a device for handling a brush head for cleaning the surfaces of large objects like aircraft, ships or buildings. The handling device has a multi-joint assembly carrying a brush head (18) on the end extension (14) of an angled mast (13) having, extending from the end extension (14), three motor-driven rotary units (60, 62, 64) arranged one behind the other and having alternately perpendicular axes (60', 62', 64') and a motor-driven telescopic linear unit (66') secured to the last rotary unit (64) and aligned with its axis of rotation (64'). In order to ensure that the brush roller is always perpendicular to the surface to be cleaned along its entire travel, even at points which are difficult of access, the invention proposes that axes (60', 66') of the rotary unit (60) on the end extension side and of the linear unit (66) be arranged in laterally staggered, mutually parallel planes.

20 Claims, 3 Drawing Sheets

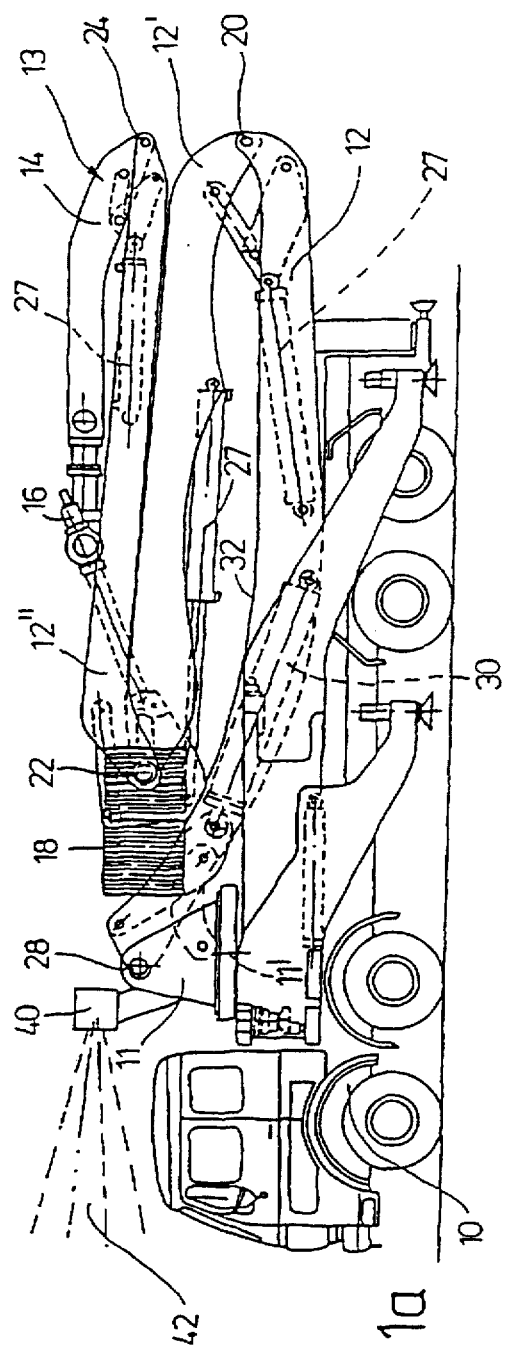
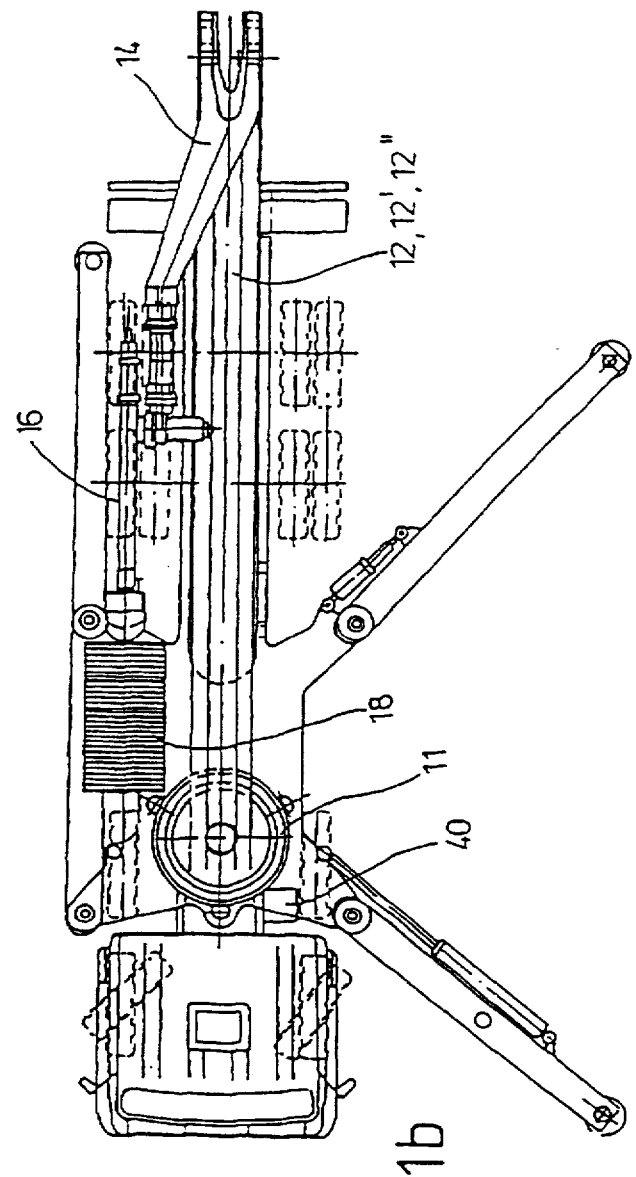
Fig. 1a
Fig. 1b

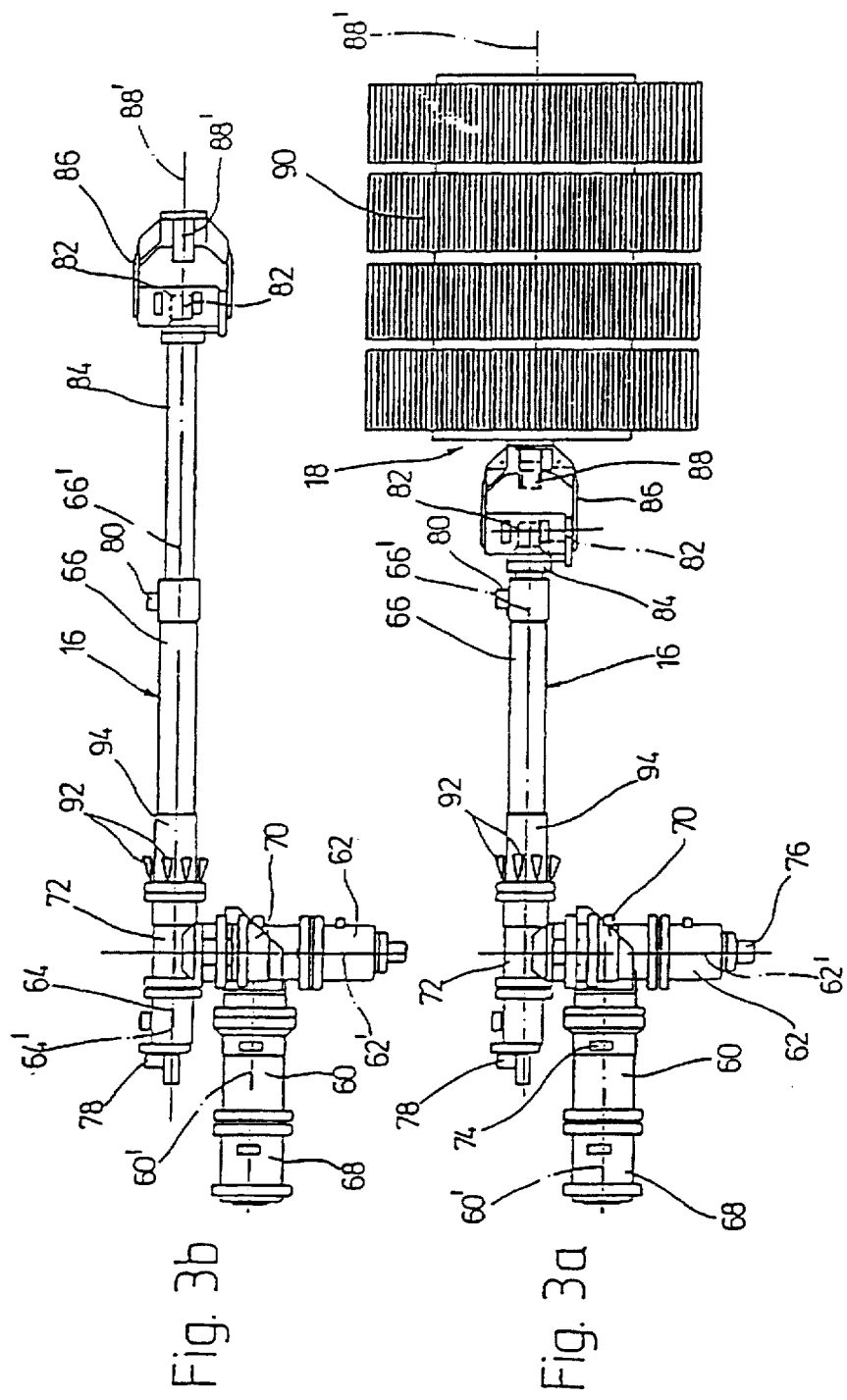
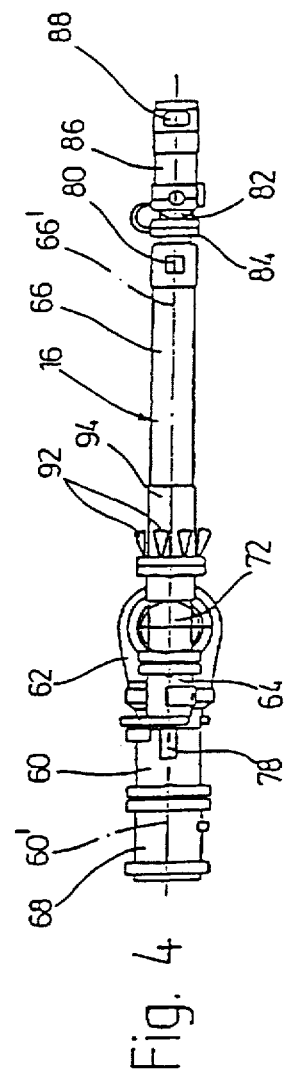

DEVICE FOR HANDLING A BRUSH HEAD FOR CLEANING THE SURFACE OF LARGE OBJECTS

FIELD OF THE INVENTION

The invention relates to a device for handling a brush head for cleaning the surfaces of large objects, like airplanes, ships, buildings, comprising a multi-joint assembly carrying the brush head and arranged on the end arm of an articulated or telescopic mast, which multi-joint assembly has from the end arm at least two motor-driven rotary units, which are arranged one behind the other and have alternately with respect to one another vertical axes, and a motor-driven telescopic-like linear unit connected to the last rotary unit, whereby the brush head is coupled to the multi-joint assembly through a further rotary unit having an axis of orientation perpendicular with respect to the telescopic axis, and has a brush roller rotatable about an axis is perpendicular with respect to the axis of orientation, and can be moved during the cleaning operation along specified paths of movement on the surface to be treated. The invention relates furthermore to a process for cleaning the surfaces using such a handling device.

BACKGROUND OF THE INVENTION

A handling device of the mentioned type is known (DE-A-40 35 519) having an articulated mast, the base arm of which is supported rotatably about a vertical axis on a bearing block arranged on an undercarriage, and the end bearing of which has a multi-joint assembly, which can be equipped with the brush head. The telescopic axis of the linear unit and the rotary unit on the side of the end arm are in this case always in one plane as a result the handling device has a relatively long building length of construction. Furthermore the rotary unit, which shaft-like follows the rotary unit on the side of the end arm with an axis, which is perpendicular to said rotary unit, has an angle of traverse limited to 180°, which results in a disadvantageous limiting of the mobility of the brush head relative to the surface to be cleaned. It is also known from the mentioned reference to load the surface to be cleaned with washing water. A washing-water channel with radially outwardly pointing openings is, for this purpose, arranged inside of the brush roller in such a manner that washing water exits over the entire length of the brush roller onto the surface to be cleaned. However, it has also been proven that these measures are not sufficient to soften the dirt dried on the surface to a degree that such dirt can be completely removed by the rotating brush.

Furthermore, it is actually known in an airplane washing device with an articulated mast, multi-joint assembly and washing brush to arrange the axis of a linear unit of the multi-joint assembly laterally staggered, and to obtain in this manner a more compact design (GB-A 1 327 901).

SUMMARY OF THE INVENTION

Starting out from this, the basic purpose of the invention is to improve the known device of the above-identified type in such a manner that along with a compact design an optimum alignment of the brush head and of the multi-joint assembly relative to the surface to be cleaned occurs and thus an improved cleaning result is guaranteed. A further purpose of the invention consists in disclosing an improved cleaning process utilizing the handling device of the invention.

The solution of the invention is based on the thought that the multi-joint assembly with its telescopic axis is always aligned approximately perpendicularly with respect to the surface to be cleaned during the cleaning operation. This is only possible when the rotary units of the multi-joint assembly permit a sufficient pivoting angle. In order to achieve this, it is suggested according to a preferred embodiment of the invention that the axes of the rotary unit on the side of the end arm and of the linear unit are arranged in laterally staggered or spaced, mutually parallel planes. This measure guarantees that the rotary unit following the rotary unit on the side of the end arm can have a pivoting range of more than 180°. If one considers that the drive motor of the rotary unit is built larger, the larger its pivoting range is, then it is here also advantageous to make a compromise between the kinematic mobility and structural input. The pivoting range of the respective rotary unit is therefore advantageously limited to 200° to 220°. On the other hand, this enlargement of the pivoting range of the second rotary unit permits without any disadvantage a continued reduction of the pivoting range of the rotary unit on the side of the brush head about its axis of orientation to less than 180°, preferably to 100° to 130°.

These measures are sufficient to align the telescopic-like linear unit essentially normally with respect to the surface to be treated by operating the rotary units along the entire path of movement of the brush head specified by the washing operation, also in the case of surfaces with a complicated design. If this would not be the case, then during its adaptation through movement of the linear unit and the axis of orientation of the brush roller, a specified path of movement would be left with the consequence that a larger covering by the paths of movement would be suspended.

Due to the always vertical alignment of the telescopic axis relative to the surface to be cleaned, it is also possible to arrange a spray device, which can be loaded with a pressurized fluid, on the multi-joint assembly, preferably in the area of the stationary part of the telescopic-like linear unit, which spray device is always aligned in direction of the surface to be treated, namely such that the brush head with its brush roller is not hit by the pressurized fluid. The spray device can for this purpose have a plurality of spray nozzles annularly arranged around the telescopic axis and loadable with a pressurized fluid, which spray nozzles can be controlled individually or in groups, preferably through magnetic valves. The spray nozzles are thereby advantageously aligned past the brush head in the direction of the surface to be treated. A soap solution is advantageously used as the pressurized fluid. It is basically also possible to spray on rinse water in the form of clear water. Furthermore, it is advantageous to load the spray device or its spray nozzles additionally with pressurized air in order to produce a foam. With this measure an optimum wetting of the layer of dirt dried on the surface to be cleaned is achieved, which layer of dirt can then be easier wiped off with the brush roller after a sufficient soaking time. The spray nozzles are advantageously rigidly connected to the stationary part of the telescopic-like linear unit, which part is on the side of the end arm. They are placed in a ring arrangement in such a manner that they spray their jets in a spray cone, which encloses the brush head and is directed onto the surface of the area to be washed. The spray cone should have an inner diameter on the area of the surface to be cleaned at least to twice the length of the brush roller so that during the washing operation the directly adjacent path of movement can also be reached by the spray jets.

A particularly advantageous development of the invention provides that the spray nozzles can be controlled individually or in groups from a central control in accordance with the path of movement covered by the brush head. It is particularly advantageous when a group of spray nozzles pointing in a forward direction of the present path of movement of the brush head is controlled together and thus results in a surface wetting shortly prior to the actual washing operation. Since the optimum wetting time lies, depending on the temperature conditions, sun rays and the like, in the order of magnitude of some minutes to a maximum of 15 minutes, it is advantageous when in addition one group of spray nozzles pointing toward the path of movement of the brush head, which is adjacent to the present path of movement, can be controlled together. Since the linear unit during the movement of the brush head along a path of movement rotates regularly about its own axis, it is necessary that also the spray nozzles rotating with the linear unit are controlled through the central control depending on the rotary position with respect to the path of movement. This can be easily accomplished through software by the movement coordinates stored in the central control and the angular positions of the telescopic axis, which angular positions can be derived therefrom.

It is basically possible after the washing operation with the help of the brush roller to rinse off the mechanically released dirt still existing on the surface to be cleaned with clear water, for which purpose it is possible to also use the spray nozzles in the area of the telescopic axis or a spray nozzle ring especially provided for this purpose.

BRIEF DESCRIPTION OF THE DRAWINGS

The invention will be discussed in greater detail hereinafter in connection with one exemplary embodiment schematically illustrated in the drawings, in which:

FIGS. 1a and b are a side view and a top view of a large manipulator with a washing brush, with the large manipulator arranged on an undercarriage;

FIGS. 3a and b are side views of the multi-joint assembly with a retracted linear unit and brush roller and with an extended linear unit (without brush roller);

FIG. 4 is a side view of the multi-joint assembly according to FIG. 3a rotated at 90° (without brush roller).

Figure 2:
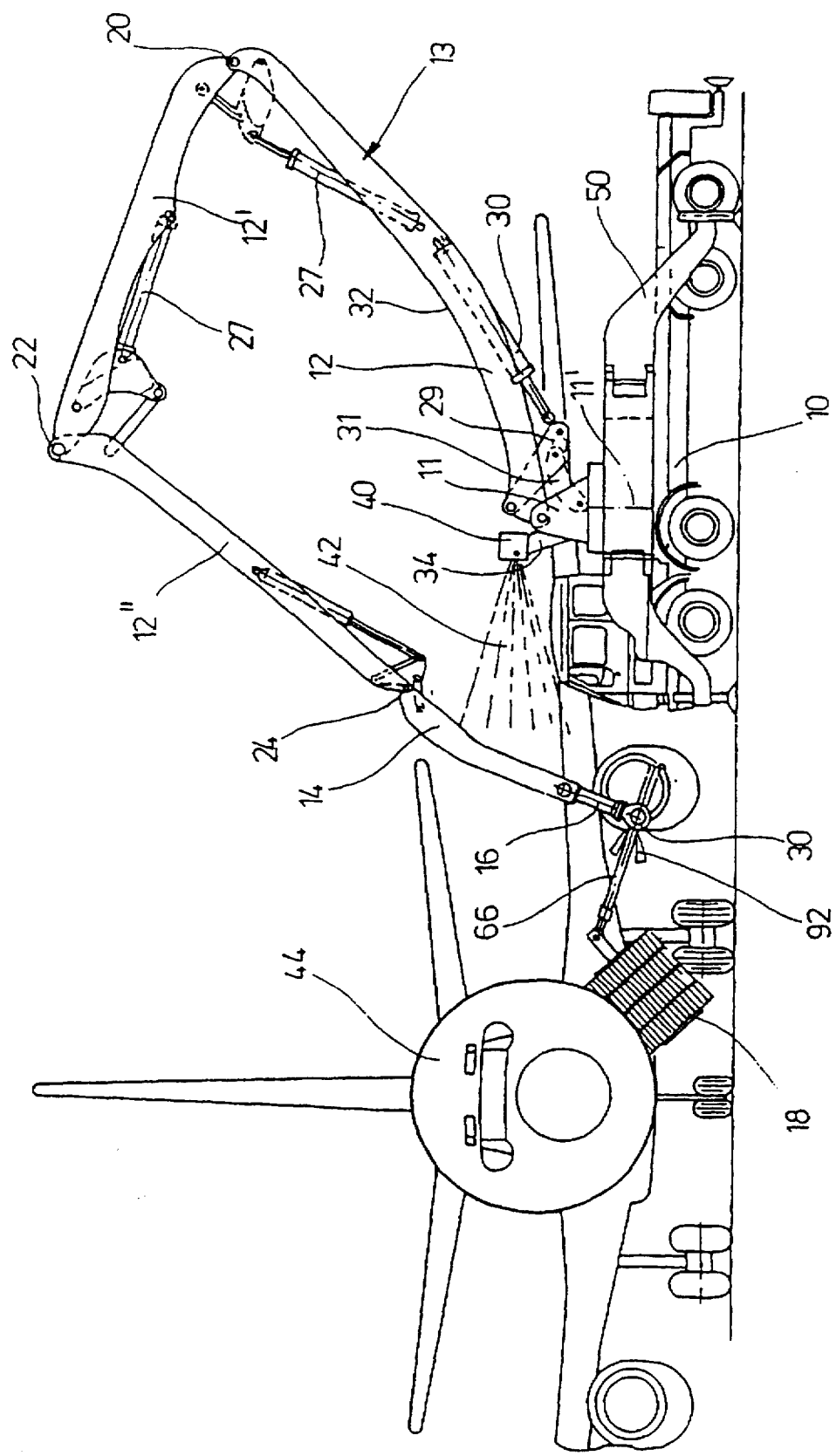
FIG. 2 is a side view of the large manipulator according to FIGS. 1a and b during washing of an airplane.

The mobile large manipulator illustrated in the drawings consists essentially of an articulated mast 13 rotatably supported with its base arm 12 about a vertical axis 11' on a pivot-bearing block 11 of a motor-driven undercarriage 10, a multi-joint assembly 16 arranged on the end arm 14 of the articulated mast 13, and a brush head 18 releasably fastened to the free end of the multi-joint assembly 16. The four arms 12, 12', 12" and 14 of the articulated mast 13 are connected with one another limitedly pivotal about horizontal axes at their ends facing one another on joints 20, 22, 24. The pivotal movement is accomplished by means of hydraulic cylinders 27 which are arranged at suitable points between the arms. The base arm 12 is supported pivotally at 180° on a pivot-bearing block 11 on a horizontal bearing 28 by means of a hydraulic cylinder 30 and a Wattsch link chain consisting of a coupling plate 29 and a connecting rod 31. The base arm 12 is positioned in the folded state underneath the other arms 12', 12", 14, whereas the end arm 14 with the multi-joint assembly 16 pointing toward the pivot-bearing block 11 and the brush head 18 is positioned above the other arms 12, 12', 12". The base arm 12 is curved in its longitudinal extent in such a manner that in the folded state its upwardly pointing edge 32 forms a concave trough for receiving the folded second arm 12;. The base arm 12 and the second and third arm 12', 12" are not bent, whereas the end arm 14 has a lateral bend 33, which makes it possible for the multi-joint assembly 16 and the brush head 18 to be positioned in the folded state next to the arms 12, 12', 12".

As can be seen from FIGS. 3a, b and 4, the multi-joint assembly 16 consists essentially of three orthogonal rotary units 60, 62, 64 with axes 60', 62', 64' which are perpendicular to one another, and a telescopic-like linear unit 66 which is connected to the last rotary unit 64 and the telescopic axis 66' of which linear unit is in alignment with the axis of rotation 64'. The rotary unit 60 can be coupled to the end arm 14 of the articulated mast 13 through a flange adapter 68. The rotary unit 60 is on the other side connected to the rotary unit 62 through an angle adapter 70, which rotary unit 62 in turn is connected to the housing of the rotary unit 64 through a further angle adapter 72. An axial shift results in this manner between the axis 60' of the rotary unit 60 and the axes 64' and 66' of the rotary unit 64 and of the linear unit 66, which axial shift permits a relatively short design of the multi-joint assembly 16 and the adjustment of any desired angle of rotation in the area of the rotary unit 62. The rotary units 60, 62, 64 can be driven by hydraulic motors and have each an angle sensor 74, 76, 78 for the respective joint axes, whereas the linear unit 66 has an integrated linear motor or hydraulic cylinder and a path sensor 80.

The brush head 18 is connected to the movable part 84 of the linear unit 66 through a further rotary unit 82 having an axis 82' perpendicular to the axis of the linear unit 66'. It has a support frame 86 connected to the drive shaft of the rotary unit 82 and a brush roller 90 rotatably supported about the axis 88' on the support frame 86 by means of a hydraulic motor 88.

As can be seen from FIG. 4, the pivoting ranges of the rotary units 62 and 82 are limited to 210° or 130° in the indicated manner, whereas the rotary units 60 and 64 have a pivoting range of 360° or are pivotal in a full circle.

This arrangement makes it possible to travel with the brush roller 90 over any desired surface contours of the plane on account of the arms 12, 12', 12", 14 and to move with the help of the multi-joint assembly 16, which can be adjusted by a motor, the brush head about the axes of rotation and the telescopic axis of the brush joint relative to the end arm 14, and a surface to be cleaned. With this it is in particularly possible to realize also in areas, which are difficult to access, an orientation of the brush roller 90 relative to the telescopic axis 66' normally with respect to the airplane surface 44, even through the orientation axis 82' of the rotary unit 82 has a narrow boundary in the angle of traversal. Consideration must thereby be given to the feeding of the brush roller 90 toward the surface 44 to be cleaned should through the linear unit 66 be normally aligned with respect to the surface to be cleaned so that the center of gravity of the brush roller 90 does not shift during the sequence of movement and does not depart the washing path.

The alignment of the telescopic axis 66', which alignment is essentially constant in the operating state, perpendicular with respect to the surface 44 to be cleaned opens up furthermore the possibility of mounting of a spray device on the stationary part 94 of the linear unit 66, which spray device consists of a plurality of spray nozzles 92 and can be loaded with pressurized fluid. The spray nozzles 92 are thereby arranged on a ring at equal angular distances around the telescopic part 94 and are aligned inclined with respect to the telescopic axis 66' so that their spray jets define in their entirety a closed spray cone enclosing the brush head. The spray nozzles can be controlled from a central control in accordance with the path of movement to be covered by the brush head individually or in groups, preferably through magnetic valves. As a pressurized fluid it is, for example, possible to use a soap solution, whereby the spray nozzles can in addition be loaded with pressurized air to create a foam.

In order to soak dried-on dirt, the surface of the airplane 44 is sprayed prior to the cleaning with the brush roller 90 along a predetermined path of movement inclined with respect to the telescopic axis with a soaking fluid or a fluid foam. The surface parts, which are in the feed route in front of the washing brush on its present path of movement, and the surface parts, which are on the adjacent path of movement following in feed route, are advantageously for this purpose sprayed with the soaking fluid or the fluid foam. Cleaning with the brush roller 90 is also done by supplying washing liquid through the inside of the brush roller in order to avoid that the bristles become dirty.

The pivot-bearing block 11 has a console 34 on its side opposite the articulated mast 13 in its folded state for housing an opto-electronic distance camera 40. This distance camera is a 3-D laser scanner, which detects a three-dimensional space within the viewing window 42 and digitalizes same with respect to the distance from the object 44 to be cleaned. Since the distance camera 40 is always aligned in operating direction during the chosen overhead operation of the articulated mast 13, it can move along with the course of the washing program and can be utilized for monitoring collisions.

In conclusion the following is to be stated: The invention relates to a device for handling of a brush head for the surface cleaning of large objects, like airplanes, ships or buildings. The handling device has a multi-joint assembly carrying the brush head 18 arranged on the end arm 14 of an articulated mast 13, which multi-joint assembly has from the end arm 14 three motor-driven rotary units 60, 62, 64 arranged one behind the other and have alternately with respect to one another vertical axes 60', 62', 64', and a motor-driven telescopic-like linear unit 66', which is connected to the last rotary unit 64 and is in alignment with its axis of rotation 64'. In order to be able to control the brush roller during the washing operation along the entire path of movement also across areas of the surface to be cleaned, which areas are difficult to access, always perpendicular with respect to said surface, it is suggested according to the invention that the axes 60', 66' of the rotary unit 60 on the side of the end arm and of the linear unit 66 are arranged in planes, which are laterally staggered and mutually parallel.

The embodiments of the invention in which an exclusive property or privilege is claimed are defined as follows.

What is claimed is:

1. A device for handling of a brush for the surface cleaning of large objects, comprising a multi-joint assembly having multiple joints to which brush means for cleaning large objects is attached, a mast having an arm assembly, the arm assembly having at least one of an articulated mast and a telescopic mast, the arm assembly having an end arm supporting the multi-joint assembly first, second and third motor-driven rotary units sequentially arranged in the multi-joint assembly and respectively having axes of rotation, the axes of the first and third rotary units being perpendicular to the axis of the second rotary unit, a motor-driven telescopically extending, linear unit connected to the third rotary unit the linear unit defining an axis, a fourth rotary unit having an axis of orientation perpendicular with respect to the axis of the linear unit and being connected to the multi-joint assembly, the brush means being rotatable about an axis perpendicular with respect to the axis of orientation of the fourth rotary unit and being moved during the cleaning operation along specified paths of movement on a surface to be treated, the axis of rotation of the third rotary unit being aligned with the axis of the linear unit, and the axis of the first rotary unit adjacent the end arm and the axis of the linear unit always being positioned in parallel planes.

2. The device according to claim 1, wherein the linear unit is aligned essentially perpendicularly with respect to the surface to be treated during the cleaning operation.

3. The device according to claim 1, wherein a spray device is arranged on the multi-joint assembly, the spray device being adapted to spray fluid past the brush means in a direction toward the surface to be treated, and to receive a pressurized fluid.

4. The device according to claim 1, wherein the axis of rotation of the third rotary unit is coaxial with the axis of the linear unit and planes containing the axis of the first rotary unit and the axis of the linear unit are always parallel to each other.

5. The device according to claim 1, wherein the second rotary unit following the first rotary unit has a limited pivoting range of more than 180° and less than 270°.

6. The device according to claim 5, wherein the second rotary unit is positioned intermediate the firsthand third rotary units and has a pivoting range of 200° to 220°.

7. The device according to claim 1, wherein the fourth rotary unit coupled to the brush means is limited pivotally about the axis of orientation with an angle of traverse of more than 90° and less than 180°.

8. The device according to claim 7, wherein the fourth rotary unit is limited pivotally in the range of 100° to 130°.

9. A device for handling brush means for the surface cleaning of large objects, comprising a multi-joint assembly having a plurality of joints to which the brush means is attached, an arm assembly having one of an articulated mast and a telescopic mast, the one mast having an end arm connected to the multi-joint assembly, first, second and third motor-driven rotary units arranged sequentially from the end arm on the multi-joint assembly, the first, second and third rotary units each defining an axis of rotation, the axes of rotation of the first and third rotary units being perpendicular to the axis of rotation of the second rotary unit, a motor-driven telescopically extending, linear unit being connected to the third rotary unit and being aligned with the axis of rotation of the third rotary unit, a fourth rotary unit with an axis of orientation coupling the brush means to the multi-joint assembly, the brush means being rotatable about an axis perpendicular to the axis of orientation and being movable during the cleaning operation along specified paths of movement on a surface to be treated, and a spray device arranged on the multi-joint assembly, the spray device being adapted to spray a fluid past the brush means in a direction toward the surface to be treated and being adapted to receive a pressurized fluid.

10. The device according to claim 9, wherein the spray device is arranged on a part of the linear unit adjacent the end arm, and is fixed with respect to the end arm.

11. The device according to claim 9, wherein the spray device has a plurality of spray nozzles arranged annularly around the linear unit and receives the pressurized fluid, and magnetic valves control the spray nozzles individually or in groups.

12. The device according to claim 11, wherein the spray nozzles direct fluid past the brush means toward the surface (44) to be treated.

13. The device according to claim 11, wherein the spray nozzles are rigidly connected to a part of the linear unit, adjacent the end arm.

14. The device according to claim 11, wherein the spray nozzles create spray jets, the spray lets defining a closed spray cone totally enclosing the brush means.

15. The device according to claim 14, wherein the spray cone has an inner diameter in the region of the surface to be cleaned having at least with twice the length of the brush means.

16. The device according to claim 11, wherein a central control for controlling the path of movement of the brush means also controls the spray nozzles individually or in groups corresponding to the path of movement covered by the brush means.

17. The device according to claim 16, wherein a group of the spray nozzles pointing in a direction forward of the present path of movement of the brush means are controlled together.

18. The device according to claim 16, wherein a group of the spray nozzles pointing toward a path of movement of the brush means, which path of movement is adjacent to the present path of movement, are controlled together.

19. The device according to claim 9 wherein the pressurized fluid consists of one of a soap solution and rinse water.

20. The device according to claim 19, wherein one of the spray device and the spray nozzles additionally receive pressurized air so as to create a foam.

* * * * *